(12) United States Patent
Schneider

(10) Patent No.: US 9,861,247 B2
(45) Date of Patent: Jan. 9, 2018

(54) PARTICLE TRAP/FILTER AND SYSTEMS RELATED THERETO

(71) Applicant: Smart Inc., Gardena, CA (US)

(72) Inventor: Paul Schneider, Gardena, CA (US)

(73) Assignee: SMART, INC., Gardena, CA (US)

( * ) Notice: Subject to any disclaimer, the term of this patent is extended or adjusted under 35 U.S.C. 154(b) by 0 days.

(21) Appl. No.: 14/849,364

(22) Filed: Sep. 9, 2015

(65) Prior Publication Data

US 2017/0065911 A1    Mar. 9, 2017

(51) Int. Cl.
*A47L 13/50* (2006.01)
*A47J 47/18* (2006.01)
*B01D 29/03* (2006.01)

(52) U.S. Cl.
CPC .............. *A47L 13/50* (2013.01); *A47J 47/18* (2013.01); *B62B 2202/028* (2013.01)

(58) Field of Classification Search
None
See application file for complete search history.

(56) References Cited

U.S. PATENT DOCUMENTS

| | | | | | |
|---|---|---|---|---|---|
| 3,541,004 | A * | 11/1970 | Cooper | .................. | B01D 65/02 210/414 |
| 4,485,645 | A * | 12/1984 | Mulder | .................. | D06F 39/10 134/104.4 |
| 5,304,305 | A * | 4/1994 | Lehrer | .................... | A23F 5/185 210/346 |
| 6,000,094 | A * | 12/1999 | Young | ..................... | A47L 13/58 15/260 |
| 6,896,144 | B2 * | 5/2005 | Young | ................. | B01L 3/50255 210/455 |
| 8,042,215 | B2 * | 10/2011 | Thibault | ................. | A47L 13/58 15/142 |
| 2010/0187234 | A1 * | 7/2010 | Saranga | ................. | B65D 25/16 220/495.01 |

\* cited by examiner

*Primary Examiner* — Michael E Barr
*Assistant Examiner* — Cristi Tate-Sims
(74) *Attorney, Agent, or Firm* — Hackler Daghighian Martino & Novak

(57) ABSTRACT

The present patent document provides embodiments of a filter and a system for use with the filter for separating dirt and other contaminates from wash liquids. In a preferred embodiment the filter comprises: a plurality of passages all oriented parallel to each other wherein the passages have a circular top with a first diameter and a circular bottom with a second smaller diameter and a portion in between the top and the bottom that is funnel shaped; a body that couples each of the plurality of passages together; wherein the passages are arranged in concentric circles radiating out from the center of the body.

25 Claims, 8 Drawing Sheets

PARTICLE TRAP/FILTER AND SYSTEMS RELATED THERETO

The present patent document relates to particle traps and filters and systems related thereto. More particularly, the present patent document relates to particle traps and filters for use in containers of fluid used for washing objects.

BACKGROUND

It has been appreciated by those skilled in the art that particles of dirt or other contaminates may cause scratches during the cleaning process. For example, if one were to clean a car with a sponge or pad, the dirt trapped between the sponge and the surface of the car may cause scratches in the paint when the sponge is moved over the surface. Accordingly, it is beneficial to try and remove as much of the dirt or other contaminants from the sponge as possible as frequently as possible. By keeping the sponge or pad clean, there is less risk of scratching the surface of the car or other object being cleaned.

Traditionally, someone cleaning a car repeatedly dunks the sponge or pad in a bucket of soapy water to remove the dirt and other particles from the sponge or pad. While this method of cleaning does help remove some of the contaminants from the cleaning object, it is not efficient in doing so. To this end, dirt or other particles may remain on the sponge or cleaning pad and cause scratches on the surface of the object being cleaned or at a minimum, prevent the maximum cleanliness from being achieved.

To this end, people have tried to come up with ways to better remove the dirt and other contaminants from the cleaning apparatus during the process of cleaning an object. Traditional strainers are not effective and filtering systems rely on pads, sponges or filters that require replacing and simply do not function well.

One proposed method is provided in U.S. Pat. No. 7,025,880, titled Fluid Receptacle and Filter System (hereinafter "'880 patent") The '880 patent provides a system for separating particles from fluid which includes a receptacle for containing fluid and a filter assembly which includes a filter component shaped to fit the receptacle, an O-ring encircling the perimeter of the filter component for securing the filter assembly in the receptacle, and at least two baffles attached to the bottom of the filter component for reducing the motion of the fluid around and through the filter assembly. While the system disclosed in the '880 patent may be more effective than traditional filters, it still does not provide the maximum effectiveness at filtering and removing dirt and contaminates from a sponge, pad or other washing device during the washing process. To this end, a more effective and efficient particle trap/filter is desirable. It would be particularly beneficial if the particle trap/filter could be used in the process of washing cars and other objects. It would also be beneficial if the particle trap/filter could be used with the traditional method of using a bucket of soapy water or other cleaning liquid.

SUMMARY OF THE EMBODIMENTS

In view of the foregoing, an object according to one aspect of the present patent document is to provide filters and systems for use with the filters for separating dirt and other contaminants from wash liquids. Preferably the methods and apparatuses address, or at least ameliorate one or more of the problems described above. To this end, a filter is provided. In one embodiment the filter comprises: a main body with a planar top surface and planer bottom surface; and, a plurality of passages that pass through the body wherein the passages have a larger diameter section that extends above the top surface and a smaller diameter section that extends below the bottom surface.

In preferred embodiments, at least a portion of the passages is funnel shaped. In yet other embodiments, the entire passage may be funnel shaped. In still yet other embodiments, the top of each passage is a straight round section that transitions into the funnel shape.

In some embodiments, the passages are arranged in concentric circles radiating out from a center of the filter. Although circular patterns of the passages is preferred, other concentric shapes may be used. For example, the passages may be patterned in concentric hexagons, octagons, decagons, or other geometric shape with multiple sides. The more sides used the closer to a circle and the more preferred.

The body of the filter includes a plurality of supports to form a gap under the bottom of the passages when the filter is installed in a container such as the bottom of a bucket. In preferred embodiments, the filter is supported by a plurality of legs that extend from the body down below the bottom of the passages. In other embodiments, other support structures may be used. If legs are used, the legs may also be funnel shaped. In some embodiments, at least a subset of the plurality of legs further include holes in their sidewalls below the body.

In some embodiments, the filter further comprises a plurality of holes through the body and located in between the passages. In some embodiments, those holes may also be funnel shaped.

Although many different manufacturing techniques may be used, the filters are preferably made from injection molded plastic. However, molding or other manufacturing techniques may be used.

In some embodiments of the filter, the filter comprises: a plurality of passages all oriented parallel to each other wherein the passages have a circular top with a first diameter and a circular bottom with a second smaller diameter and a portion in between the top and the bottom that is funnel shaped; a body that couples each of the plurality of passages together; wherein the passages are arranged in concentric circles radiating out from the center of the body. In some of these embodiments, the top extends above a top of the body and the bottom extends below a bottom of the body.

In another aspect of the embodiments described herein, a system for separating dirt from a cleaning liquid is provided. In some embodiments of the system, the system comprises: a filter as described herein; and, a bucket with an inner diameter designed to receive the outer diameter of the filter. In preferred embodiments of the system, the system further comprises a seal designed to seal the filter to the bucket.

Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE EMBODIMENTS

Figure 1:
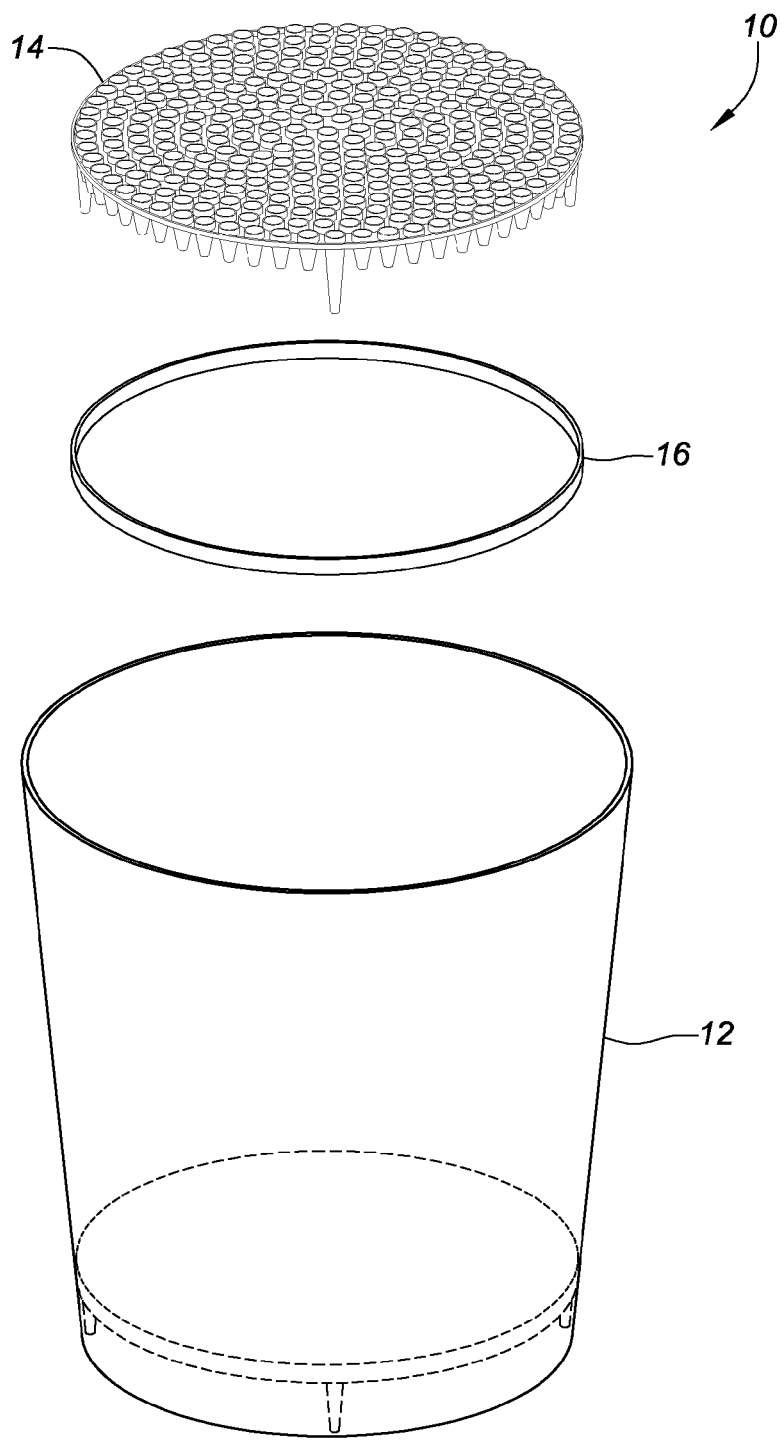
FIG. 1 illustrates an exploded view of one embodiment of a system for providing clean wash water.
Figure 2:
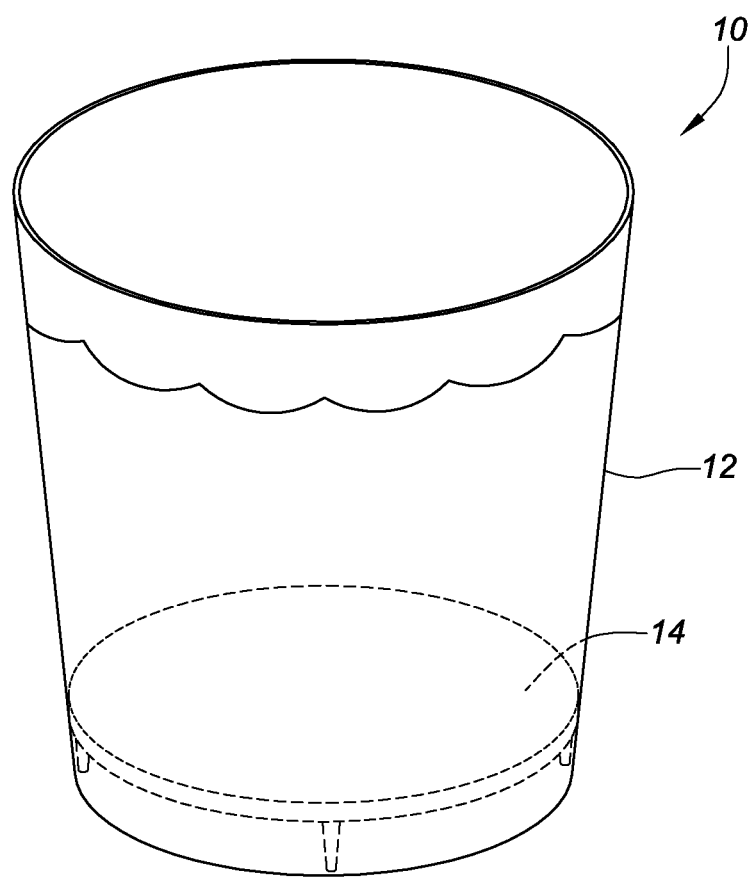
FIG. 2 illustrates an isometric view of a system for separating dirt and other contaminants from a wash liquid with a filter as described herein located on the bottom of a container.

The present patent document discloses systems, apparatus and methods to deliver clean wash water without replacing filters. FIG. 1 illustrates an exploded view of one embodiment of a system for providing clean wash water. The embodiment shown in FIG. 1 comprises a container 12, a filter 14 and a seal 16. FIG. 2 illustrates an assembled version of the embodiment of FIG. 1 with the filter 14 placed in the bottom of the container 12.

Container 12 may be any type of container including a bucket, bin, cup, tub or any other type of container that can hold a fluid. Moreover, container 12 may be made of various different materials including metal, glass or plastic to name a few. In a preferred embodiment, container 12 is a bucket and may further include a handle and/or lid (not shown). In an even more preferred embodiment, container 12 is a standard size bucket such as a 1 gallon, 2 gallon or 5 gallon bucket. Although container 12 may be any shape, it is preferably cylindrical.

In a preferred embodiment, filter 14 is shaped and sized to fig snuggly inside of container 12. As used herein, a snug fit means that the diameter of the filter 14 is slightly smaller than the inner diameter of container 12. For example, filter 14 may have a diameter of approximately 1 millimeter less than the inside diameter of container 12 where the filter sits when assembled. In some embodiments, a seal 16 is placed in the space between the outside of the filter 14 and the inside of the container 16. The seal acts to provide a complete or partial fluid seal between the filter 14 and the container 12. In preferred embodiments, the seal is made from rubber, silicone or another soft deformable material. In some embodiments, seal 16 may be an O-ring. In some embodiments, no seal 16 is used. In some embodiments the diameter of the outside of the filter may be sized such that when it is pushed into a container with a reducing inside diameter, it may be pushed down until an interference fit occurs. To this end, a correctly shaped and sized container 12 and filter 14 may be provided such that the filter 14 is self-positioning at the correct depth within the container.

While in some embodiments a seal 16 may be used, in other embodiments no seal 16 is used. In embodiments without a seal 16, whatever gap exists between the outside of the filter 14 an the inside of the container 12 may serve as an air release.

In some embodiments, the diameter of the outside of the filter 14 may vary in order for the filter 14 to match a changing diameter in the inside of a container 12. For example, the top of the filter 14 may have a slightly larger diameter than the bottom of the filter 14 such that the filter 14 wedges inside a container 12 with a reducing inner diameter.

The filter 14 may be made out of various different kinds of materials but is preferably made from plastic. Filter 14 may be created using molding, injections molding, 3D printing such as Selective Laser Sintering (SLS) or other rapid prototype manufacturing, or other manufacturing methods.

In some embodiments, the filter 14 is designed to be less buoyant than the liquid it will be submerged in and particularly, less buoyant that water. This allows the filter 14 to stay down under the surface of the wash liquid. In some embodiments, this is achieved by the way the passages are positioned and their shape. The shape of the passages may also help keep the filter submerged in the wash water. For example, where the passages have a bigger diameter at a top and the smaller diameter is at the bottom. Finally, a planar body 21, as shown in FIG. 3 also helps the filter 14 stay at the bottom of a container 12 filled with a wash liquid.

As may be seen in FIG. 2, the container may be filled or partially filled with a cleaning fluid. The cleaning fluid may be any type of cleaning fluid including but not limited to water, soapy water, water with a soap additive, chemical solutions, cleaning agents or any other type of cleaner or cleaning fluid.

Figure 3:
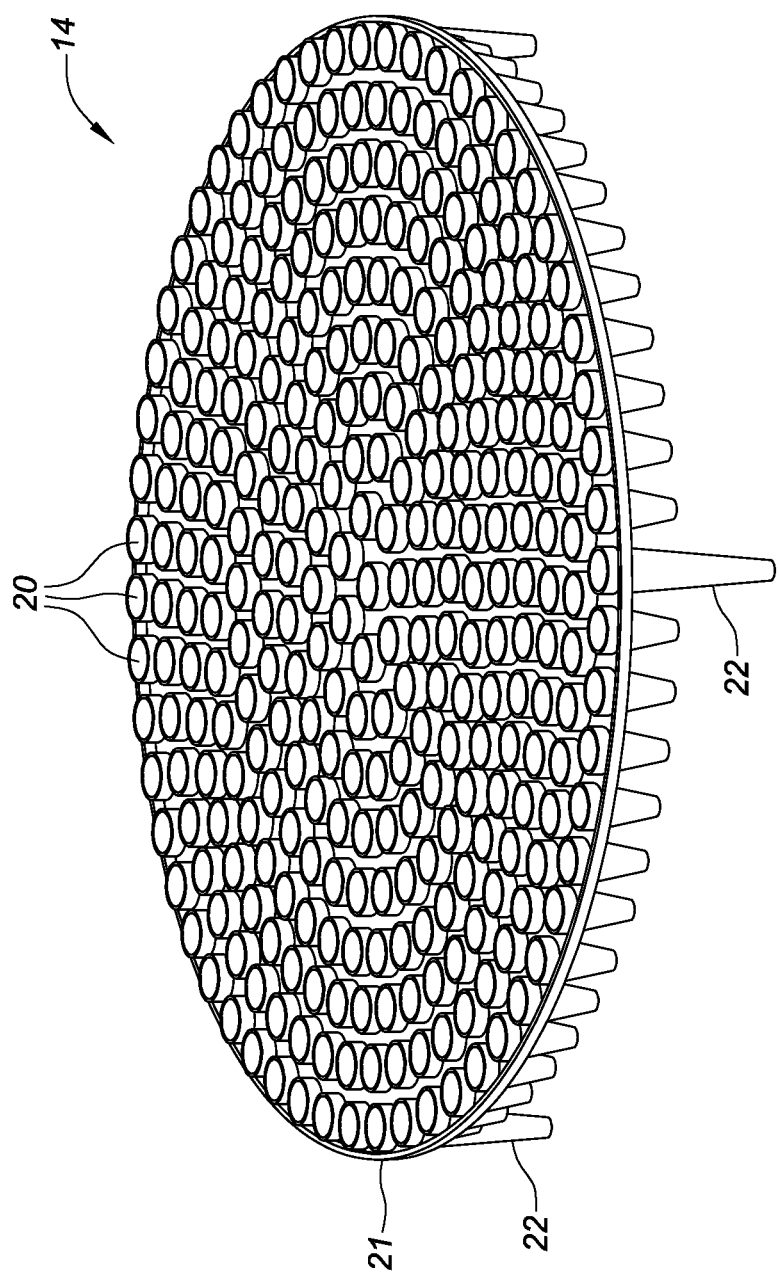
FIG. 3 illustrates an isometric view of one embodiment of a filter according to the teachings of the present patent document.

FIG. 3 illustrates an isometric view of one embodiment of a filter 14 according to the teachings of the present patent document. In the embodiment of the filter 14 shown in FIG. 3, the filter 14 includes a plurality of passages 20 that pass through the filter from the top to the bottom. The passages are all connected together by a body 21. The body 21 connects each of the outer walls of the passages 20 together to form a continuous filter 14. In a preferred embodiment, the body 21 is generally planar located with a thickness such that a top portion of the passage projects above the top surface of the body 21 and a lower portion of the passage projects below the bottom surface of the body 21. To this end, the body 21 is much thinner than the thickness of the filter 14. A thinner body 21 reduces weight and manufacturing costs. As will be discussed below, allowing the passages to extend above and below the body 21 also has additional benefits.

In some embodiments, body 21 can have a slanted angle from the outer to the center of the body, creating a funnel-like feature where any dirt not trap by the passages 20 can fall to the center. This creates one big funnel out of the entire body. In other embodiments, the slope may be in the opposite direction such that any dirt not trap by the passages 20 would fall to the outer diameter of body 21.

In the embodiment shown, the passages 20 are small half inch diameter plastic cone that point down into the container 12 when the filter 14 is inserted. As may be seen in this embodiment, the passages 20 may be a tapering, cone-shaped piece of plastic with small holes in the top that gradually get smaller towards the bottom. As explained in more detail below, the shape and orientation of these passages are important to creating an effective filter.

In the embodiments described herein, the passages 20 on the filter 14 are configured to utilize the natural centrifuge that is created during the wash process. As a user inserts their hand in and out of the water and soap filled container 12, a natural rotation of the liquid inside the container 12 is created. This rotation moves the wash liquid around and into the passages 20 where it can be filtered. The rotations created in the container 12 combined with gravity create the ideal environment for spinning water to filter through the system—delivering the most effective way to separate the grit out of the water or other liquid.

In the embodiments disclosed herein, the passages 20 and filter 14 are configured to promote this centrifuge effect to clean the water and trap dirt at the bottom of the container 12 allowing clean water to flow back to the top above the filter 14.

Figure 4:
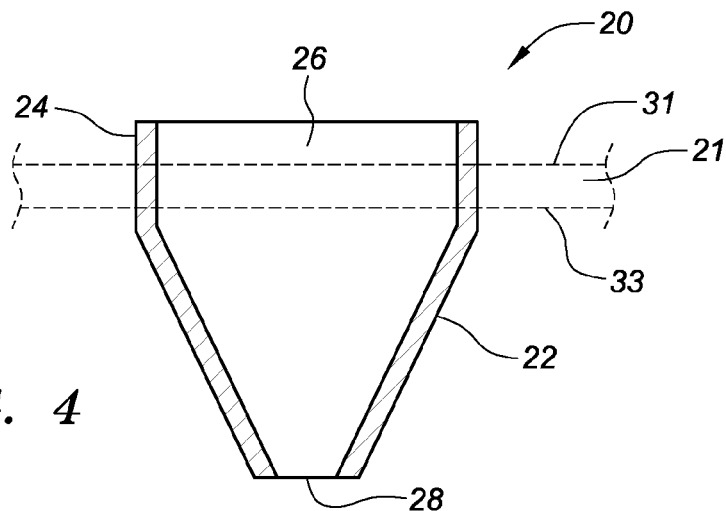
FIG. 4 illustrates a cross sectional view of one design of a passage for use with the filter embodiments described herein.

FIG. 4 illustrates a cross section of one design of a passage 20 for use with the filter 14 embodiments described herein. As may be seen in FIG. 4, the passage 20 is preferably cone shaped and has a funnel portion 22. In preferred embodiments, the passage 20 has a larger diameter hole 26 at the top and a smaller diameter hole 28 at the bottom with a funnel shaped wall 22 connecting the larger diameter hole 26 to the smaller diameter hole 28. The larger diameter hole 26 at the top makes it easy for the particulates in the cleaning fluid to enter the passage 20 from the top while making it difficult for them to enter the passage from the bottom. This helps trap the particulates in the wash fluid under the filter 14. Moreover, the funnel shape 22 helps promote the natural centrifuge effect created in the wash fluid when a user pushes their hand in and out of the container 12.

In preferred embodiments, the passage includes a portion 24 that extends above the body 21 of the filter 14. The portion 24 of the passage that extends above the top surface 31 of the body 21 of the filter 14 may also be referred to as a "lip" 24. The lip 24 provides a better cyclone design as well as making it the ideal surface for cleaning wash pads, mash mitts, sponges, buffing pads or any other type of washing device. By lifting the passages 20 such that they extend above the body of the filter 14 they work better and clean items rubbed against them, therefore making them an ideal wash board. In preferred embodiments, the lip 24 may be a small portion of the passage 20. In some embodiments, 10% of the passage 20 extends above the top surface 31 of the body 21 of the filter 14 while in other embodiments only 5% or 3% extends above the body 21 of the filter 14. A subtle lift assures that no dirt or grime can stay trapped between the passages 20.

As may be seen in the cross section of the passage 20 shown in FIG. 4, in some embodiments, the entire passage is not required to be a funnel 22. As may be seen, the passage 20 may be made up of portions like the lip 24 that are not part of the funnel 22. However, in the preferred embodiments disclosed herein, at least a portion of the passage 20 is funnel shaped 22. In the embodiment shown in FIG. 4, the passage 20 comprises a funnel shaped portion 22 that extends up from the smaller diameter hole 28 with a steadily increasing diameter. In some embodiments, the funnel shaped portion 22 may extend all the way to the top of the larger diameter hole 26. However, in some embodiments, the funnel shaped portion 22 may terminate at an upper portion that is comprised of a vertical wall. The vertical wall may form the lip 24. In yet other embodiments, the passage 20 may also include a vertical wall portion at the bottom of the funnel shaped portion 22. In still yet other embodiments, the passage 20 may be made of combinations of vertical wall portions and funnel portions. In embodiments with cross section of varying designs, the funnel portions may have walls with varying slope or identical slopes or a mix of both.

Figure 5:
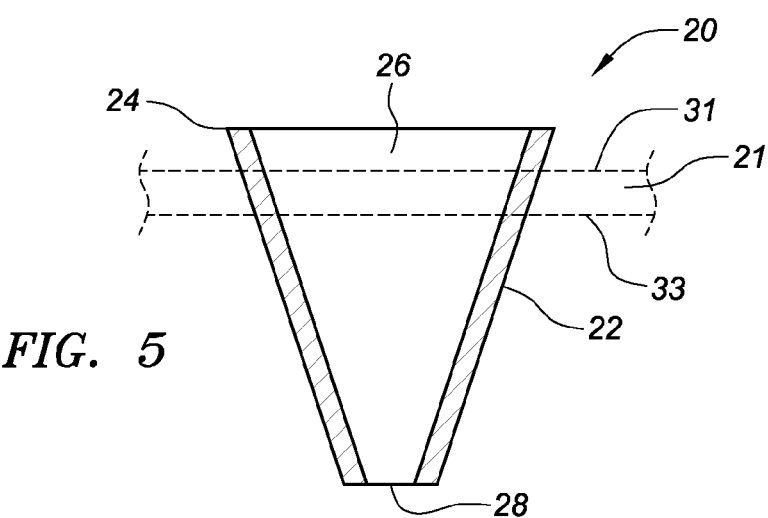
FIG. 5 illustrates a cross-sectional view of another embodiment of a passage for use in a filter.

FIG. 5 illustrates a cross-sectional view of another embodiment of a passage 20 for use in a filter 14. In the embodiment shown in FIG. 5, the entire passage 20 is constructed of a funnel 22. In preferred embodiments, the top of the funnel 22 may be pushed up above the body 21 of the filter 14 as shown.

Figure 6:
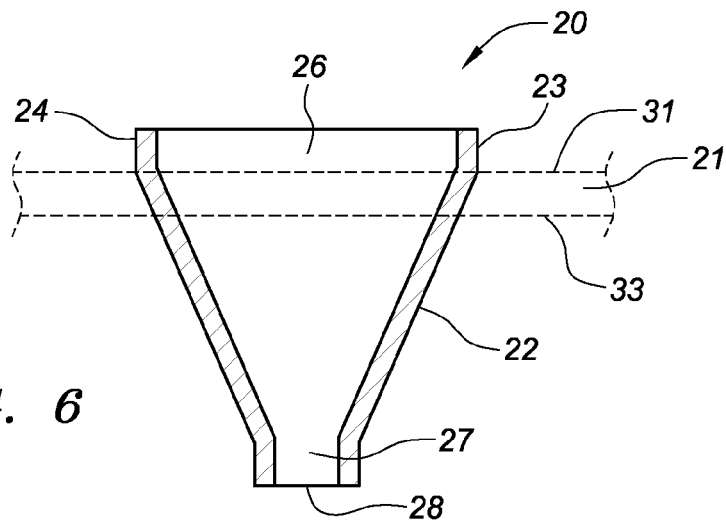
FIG. 6 illustrates a cross-sectional view of another embodiment of a passage for use in a filter.

FIG. 6 illustrates a cross-sectional view of another embodiment of a passage 20 for use in a filter 14. The embodiment shown in FIG. 6 includes a plurality of varying sections. The top of the passage 20 consists of a vertical section 23. The vertical section 23 transitions into a funnel section 22. Finally, the funnel section 22 transitions into another vertical section 27. As may be seen, the top portion 24 of the passage 20 forms a lip 24 my rising above the body 21 of the filter 14.

In operation, the filter 14 is placed in a container full of a washing liquid. The passages 20 within the filter 14 work with the natural centrifugal force created in the wash liquid within the container 12 to trap dirt and other contaminants below the filter 14. The dirt particles floating in the water are drawn through the passages 20, spin around, drops down, and collect in the bottom of the container 12 where they are prevented from coming into contact with the sponge cloth or other washing device being used.

Figure 7:
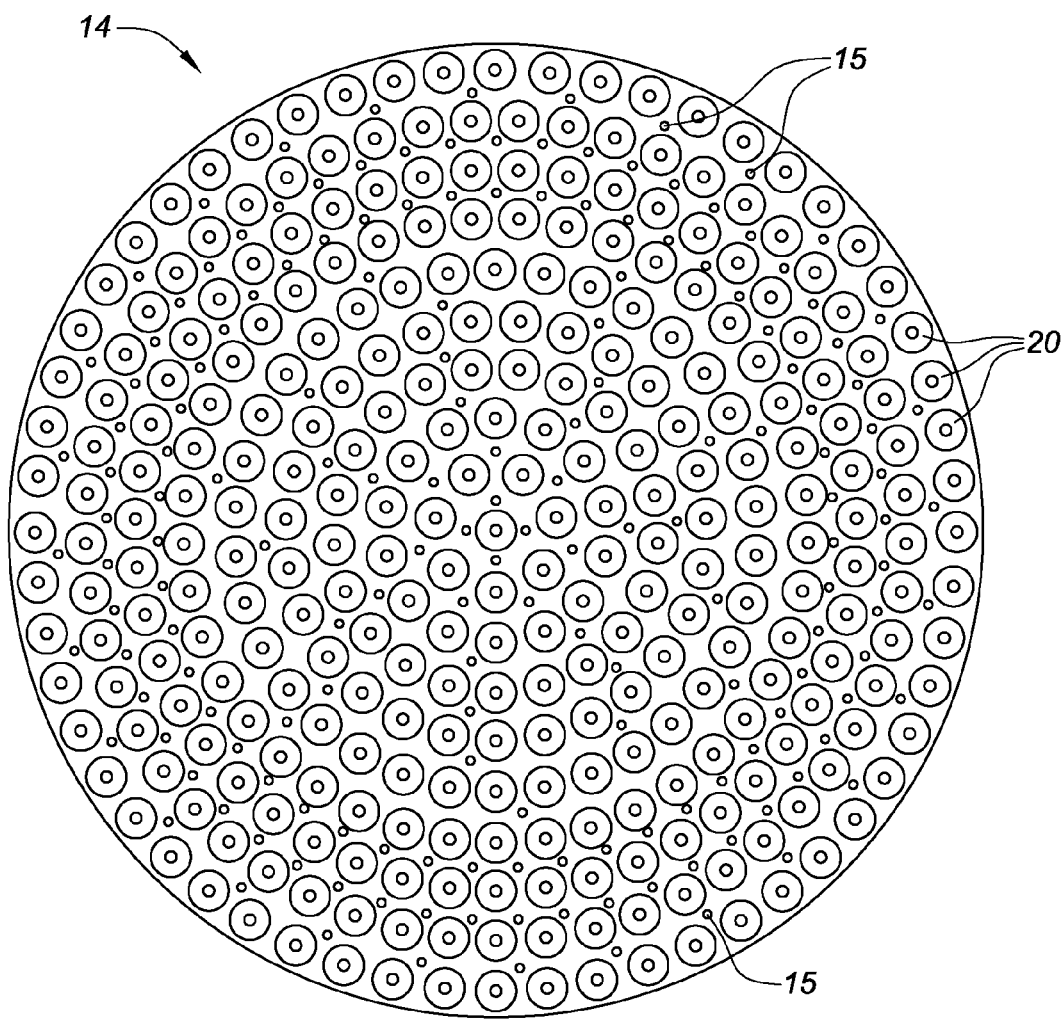
FIG. 7 illustrates a top view of the embodiment of the filter in FIG. 3.

FIG. 7 is a top down view of a filter 14. As may be seen, filter 14 includes a plurality of passages 20. In a preferred embodiment, the passages 20 are spaced such that they cover as much of the top of the body 21 of the filter 14 as possible.

In FIG. 7, filter 14 is illustrated as round but filter 14 may be any shape. Filter 14 is preferably shaped to match the interior shape of container 12. Round is preferable for both because round promotes the spinning of the wash fluid and the centrifugal effects created thereby.

In some embodiments, the passages 20 may be placed randomly within the body 21 of the filter 14. In yet other embodiments, the passages 20 may be patterned. By maximizing the spread of the passages 20 along with systematically and geometrically placing the passages 20 over the surface of the filter 14, a more efficient method of filtering water during a wash may be provided. In a preferred embodiment, the passages are patterned in circles that start in the center and extend to the outer edge of the filter 14. As may be seen in the embodiment in FIG. 7, the passages 20 are patterned in 9 concentric circles across the radius of the filter 14. Depending on the size of the passages 20 and the size of the filter 14, any number of concentric circles may be used such the filter 14 is covered with passages 20. Patterning the passages 20 in concentric circles helps further promote the rotation of the wash liquid and increases the centrifugal forces created thereby. Although concentric circles are preferred, the passages may be oriented or patterned in other ways.

In some embodiments, the space between the passages 20 is preferably minimized. To this end, the concentric circles of passages 20 may be rotated with respect to each other such that the diameters of the passages 20 in one concentric circle falls between the diameters of two passages 20 in a neighboring concentric circle. In this way, the concentric circles can be pushed closer together and the space between the passages 20 minimized.

Figure 8:
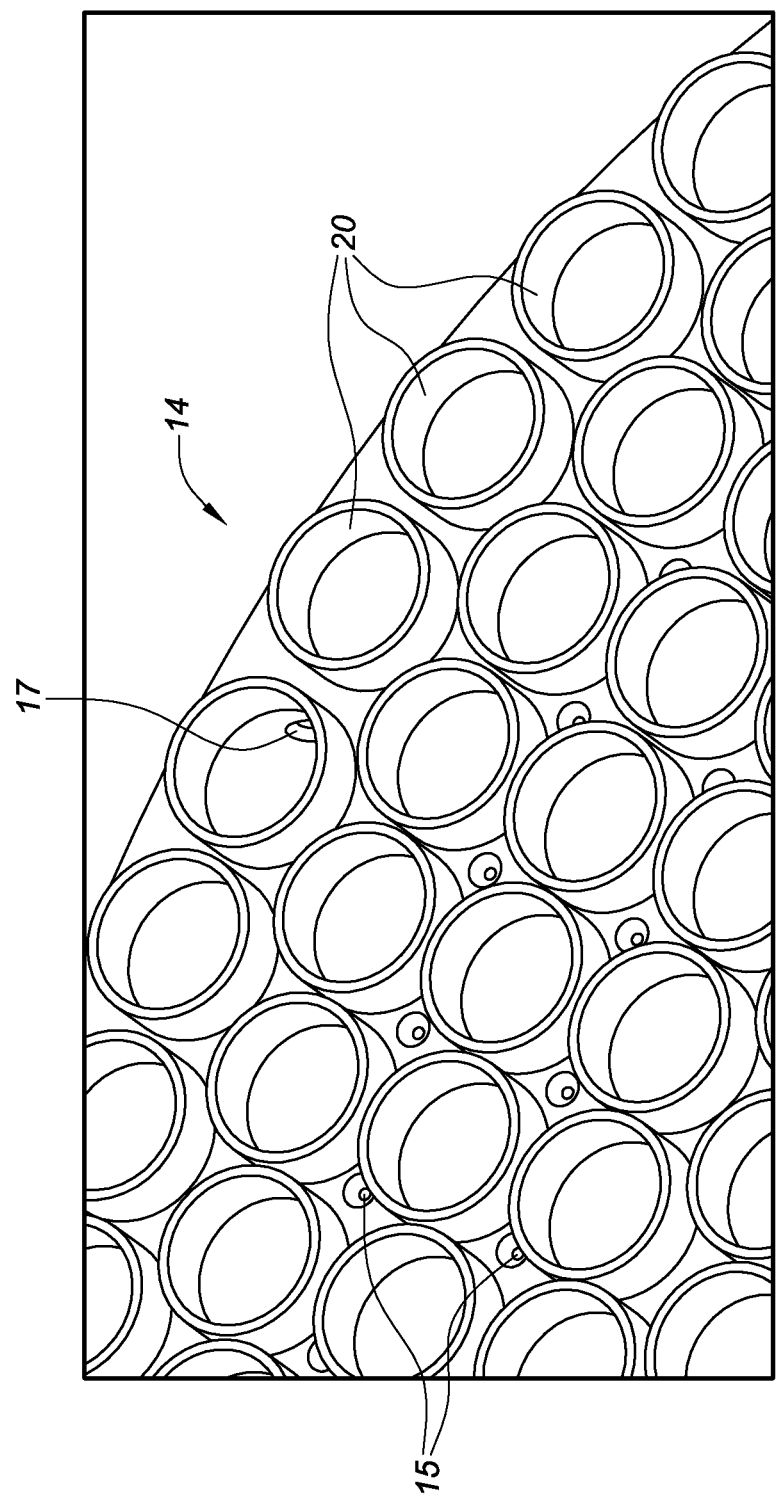
FIG. 8 illustrates a close up view of an edge portion of the filter of FIG. 3.

FIG. 8 illustrates a close up view of a portion of one embodiment of a filter 14. As may be seen in FIG. 8, in some embodiments, the filter 14 may include holes 15 in the spaces between the passages 20. The holes 15 may help trapped air be released when the filter 14 is first pushed into the wash liquid. The holes may further act as filters for particles that fall between passages 20. Any number of holes 15 may be used and a single filter 14 may have only a few holes 15 or may have a hole 15 in every space between the passages 20.

The holes 15 may be any shape or size. In most embodiments, the holes 15 will be significantly smaller than the passages 20. In some embodiments, the holes 15 may also have a funnel shape. In other embodiments, the holes may simply pass straight through. In yet other embodiments, no holes 15 exist in the spaces between the passages 20.

Instead of or in addition to holes 15, filter 14 may have holes 17 in the side walls of some of the passages. It is important that hole 17 in the side wall of passage 20 is located under the plane of the filter 14 such that dirt falling through the hole is trapped under filter 14. Any number of holes 17 may be used. Preferably, only a select number of passages 20 include holes 17. In preferred embodiments, 10-20% of the passages include holes 17. In yet other embodiments, less than 10% of the passages 20 include holes 17 and in some embodiments, holes 17 in the side walls of the passages 20 may not be used at all. If holes 17 are used, they may be made large enough to allow the tip of a human finger fit into the hole such that it may be used to better grasp the filter 14.

In yet other embodiments, one or more larger passages 20 may be created within the plane of the body that can accommodate a human finger. These passages 20 may be bunched such that a human hand can easily pick up the filter. In a preferred embodiment, four large passages 20 may be located in the center of body.

Figure 9:
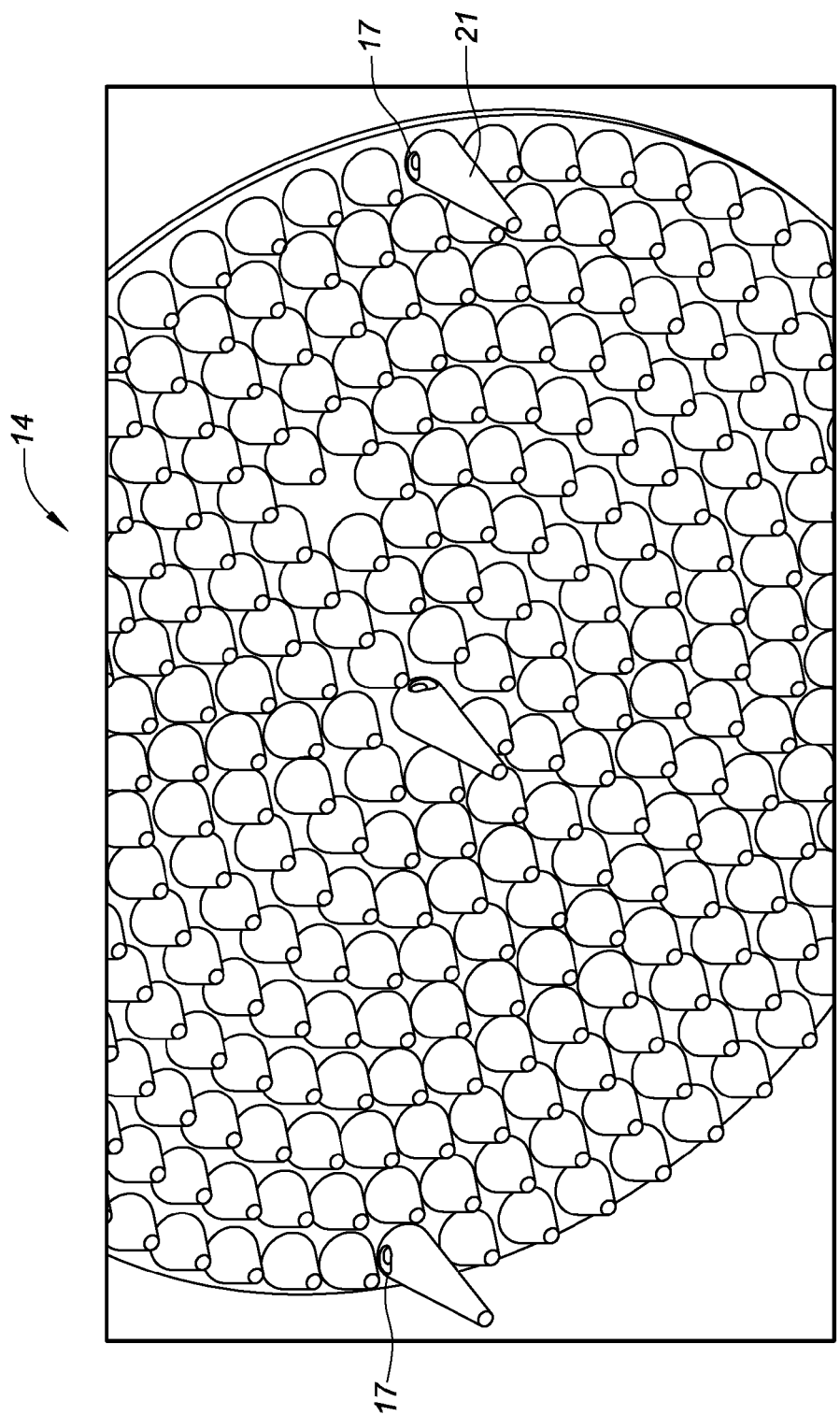
FIG. 9 illustrates an isometric view of the bottom of the filter of FIG. 3.

FIG. 9 illustrates an isometric view of the bottom of one embodiment of a filter 14. As may be seen in FIG. 9, the filter 14 may include a plurality of legs or stands 25. Legs 25 are extrusions from the bottom of the filter 14 that extend down past the bottom of the passages 20 such that the entire filter 14 is suspended off the bottom of the container 12 by the legs 25 when the filter 14 is placed in the container 12. Thus, when the filter 14 is placed in a container 12, the distance from the bottom of the legs 25 to the bottom of the passages 20 is a gap that is used to trap the dirt and particulates in the washing fluid.

In a preferred embodiment, the legs/stands 25 may simply be longer versions of passages 20. As may be seen in FIG. 9, the legs 25 have the same shape and design as the other passages 20 except the legs 25 have a longer, extended funnel section 22. In preferred embodiments, a set of legs 25 are positioned around the outer diameter. Additional legs 25 may also be used more towards the center of the filter. As may be seen in FIG. 9, a single leg 25 was added in the very center of the filter 14.

Figure 10:
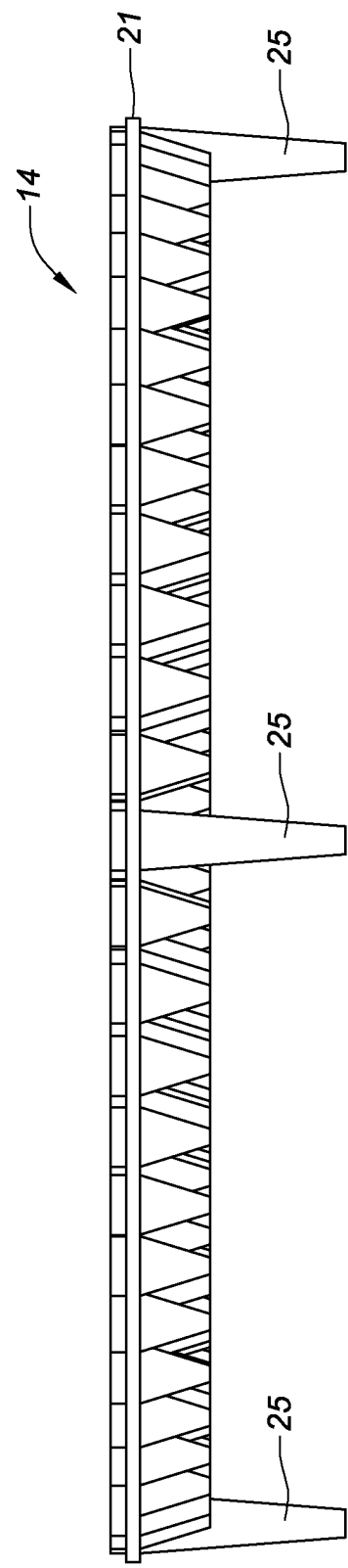
FIG. 10 illustrates a side view of the filter of FIG. 3.

FIG. 10 illustrates a side view of one embodiment of a filter 14. As may be seen in FIG. 10, the legs 25 extend down past the bottom of the passages 20 forming a gap under the filter 14 when the filter 14 is placed in the container 12. As may also be seen, the passages 20 extend above and below the body 21 of the filter 14.

Depending on the application, any number of passages 20 may be used on a filter 14. In some embodiments, a single filter 14 may contain tens, hundreds, or even thousands of passages 20. Passages 20 may be any size.

The passages 20 of the filter 14 are preferably sized to reduce the volume of grit, dust and dirt particles floating through the wash liquid. In some embodiments, the passages 20 have a large diameter of 2.5 centimeters and a small diameter of around 1 mm. However, the passages 20 may have a large diameter larger or smaller depending on the application. In some embodiments the passages have a large diameter of 20 cm. In still yet other embodiments, the large diameter may be 8 cm, 5 cm, or 3 cm. In still yet other embodiments, other sizes may be used. Similarly, the smaller diameter may include a range of sizes. In a preferred embodiment, the smaller diameter of the funnel 22 is smaller than 1 cm. Preferably, the small diameter is 8 mm, 6 mm, 4 mm, 3 mm, 2 mm or 1 mm. Preferably, the smaller diameter is sized to let large dirt particles to pass through from the top to the bottom while making it difficult for any particles to pass in the opposite direction.

Preferably the ratio of the larger diameter to the smaller diameter is at least 10 to 1. However, in other embodiments other ration may be used. In some embodiments, a ratio of 100 to 1 may be used. In yet other embodiments 50 to 1, 30 to 1, 5 to 1 or 3 to 1 may be used. In yet other embodiments, still other ratios may be used.

Generally, the smaller the passages 20, the higher the centrifugal forces exerted on the dust particles. To this end, a filter 14 with smaller and more abundant passages 20 is preferable. A filter 14 with a plurality of small funnel shaped passages 20 creates an efficient fluid straining and filtering system allowing separate smaller particles of dust and dirt to separate from wash fluids fast and efficiently.

Although embodiments of filters and systems and methods for use have been described with reference to preferred configurations and specific examples, it will readily be appreciated by those skilled in the art that many modifications and adaptations are possible without departure from the spirit and scope of the embodiments as claimed hereinafter. Thus, it is to be clearly understood that this description is made only by way of example and not as a limitation on the scope of the embodiments as claimed below.

What is claimed is:

1. A filter comprising:
a main body with a planar top surface and planer bottom surface; and,
a plurality of passages that pass continuously through the body wherein the passages have outer walls with a larger diameter cross-section that extends above the top surface and a smaller diameter cross-section that extends below the bottom surface.

2. The filter of claim 1, wherein the passages, including the outer walls, have a funnel shaped section.

3. The filter of claim 1, wherein the top of each passage, including the outer walls, is a straight round section that forms a cylinder that transitions into a funnel shaped section.

4. The filter of claim 1, wherein the passages are arranged in concentric circles radiating out from a center of the filter.

5. The filter of claim 1, further comprising a plurality of legs that extend from the body down below a bottom of the passages.

6. The filter of claim 5, wherein each of the plurality of legs is also a funnel shaped passage.

7. The filter of claim 6, wherein a subset of the plurality of legs further include holes in their sidewalls below the body.

8. The filter of claim 1, further comprising a plurality of holes through the body and located in between the passages.

9. The filter of claim 8, wherein the holes are funnel shaped.

10. The filter of claim 1 wherein the filter is made from injection molded plastic.

11. A filter comprising:
a plurality of passages all oriented parallel to each other wherein the passages have outer walls that form a circular top with a first outer diameter and a circular bottom with a second smaller outer diameter and a portion in between the top and the bottom that is funnel shaped;

a body that couples each of the plurality of passages together such that the outer walls extend above and below the body.

12. The filter of claim 11, wherein the passages are arranged in concentric circles radiating out from the center of the body.

13. The filter of claim 11, wherein the top of each passage is a straight round section that forms a cylinder that transitions into a funnel shaped section.

14. The filter of claim 12, further comprising a plurality of legs that extend from the body down below a bottom of the passages.

15. The filter of claim 14, wherein each of the plurality of legs is also a funnel shaped passage.

16. The filter of claim 15, wherein a subset of the plurality of legs further include holes in their sidewalls below the body.

17. The filter of claim 11, further comprising a plurality of holes through the body and located in between the passages.

18. The filter of claim 17, wherein the holes are funnel shaped.

19. A system for separating dirt from a cleaning liquid comprising: the filter of claim 11; and, a bucket with an inner diameter designed to receive the outer diameter of the filter.

20. The system of claim 19, further comprising a seal designed to seal the filter to the bucket.

21. The filter of claim 1, wherein the plurality of passages are placed with respect to the body such that 10% or less of a length of a passage extends above the body.

22. The filter of claim 1, wherein the passage, including the outer walls, is cylindrically shaped above the body and has a funnel shaped section below the body.

23. The filter of claim 11, wherein the plurality of passages are placed with respect to the body such that 10% or less of a length of a passage extends above the body.

24. The filter of claim 11, wherein an outer edge of the body is round and wherein the tops of the plurality of passages form a plane and wherein the body is sloped with respect to the plane from the outer edge of the body to a center of the body.

25. The filter of claim 11, wherein an outer edge of the body is round and wherein the tops of the plurality of passages form a plane and wherein the body is sloped with respect to the plane from a center of the body towards the outer edge of the body.

* * * * *